UNITED STATES PATENT OFFICE.

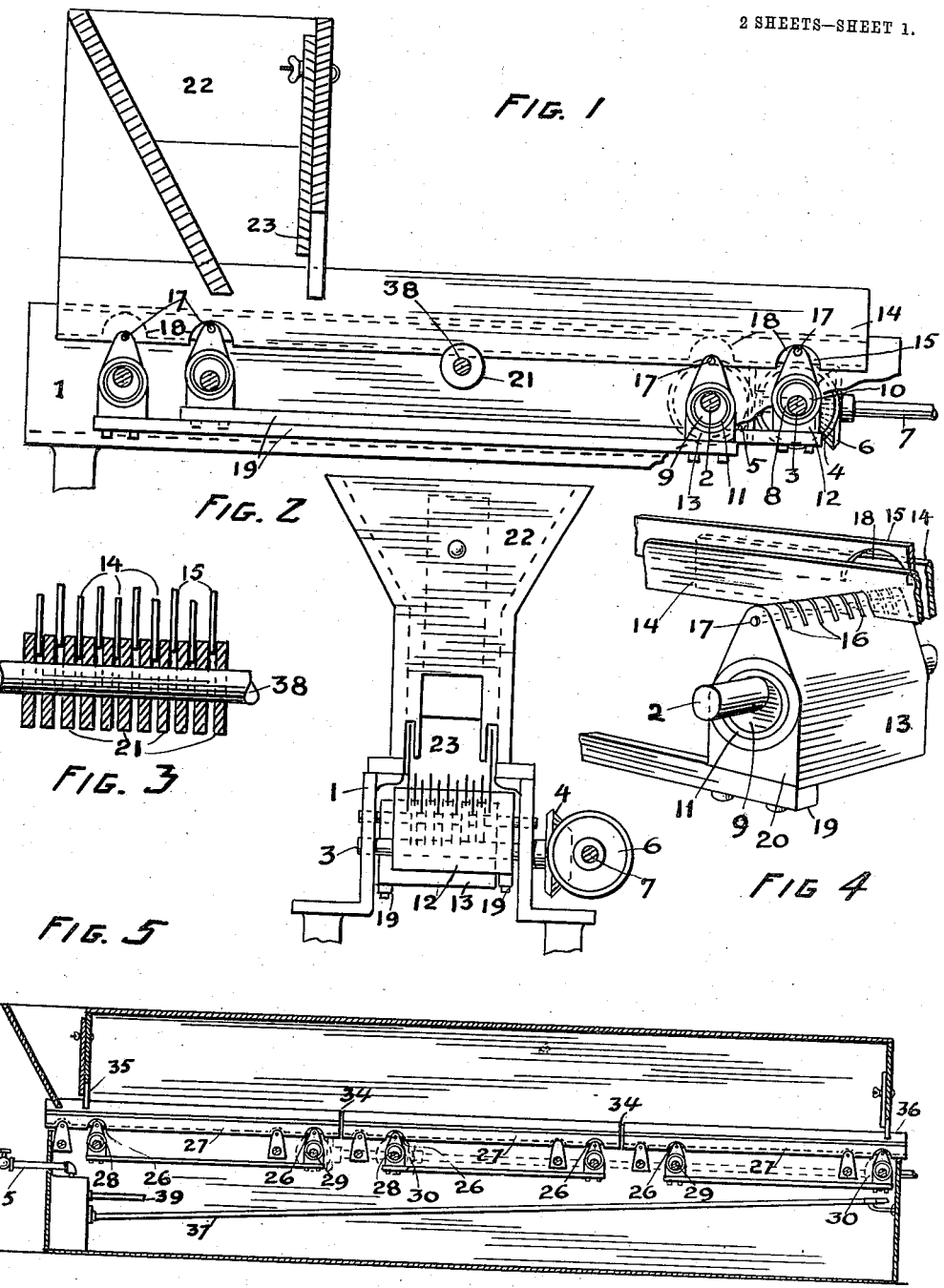

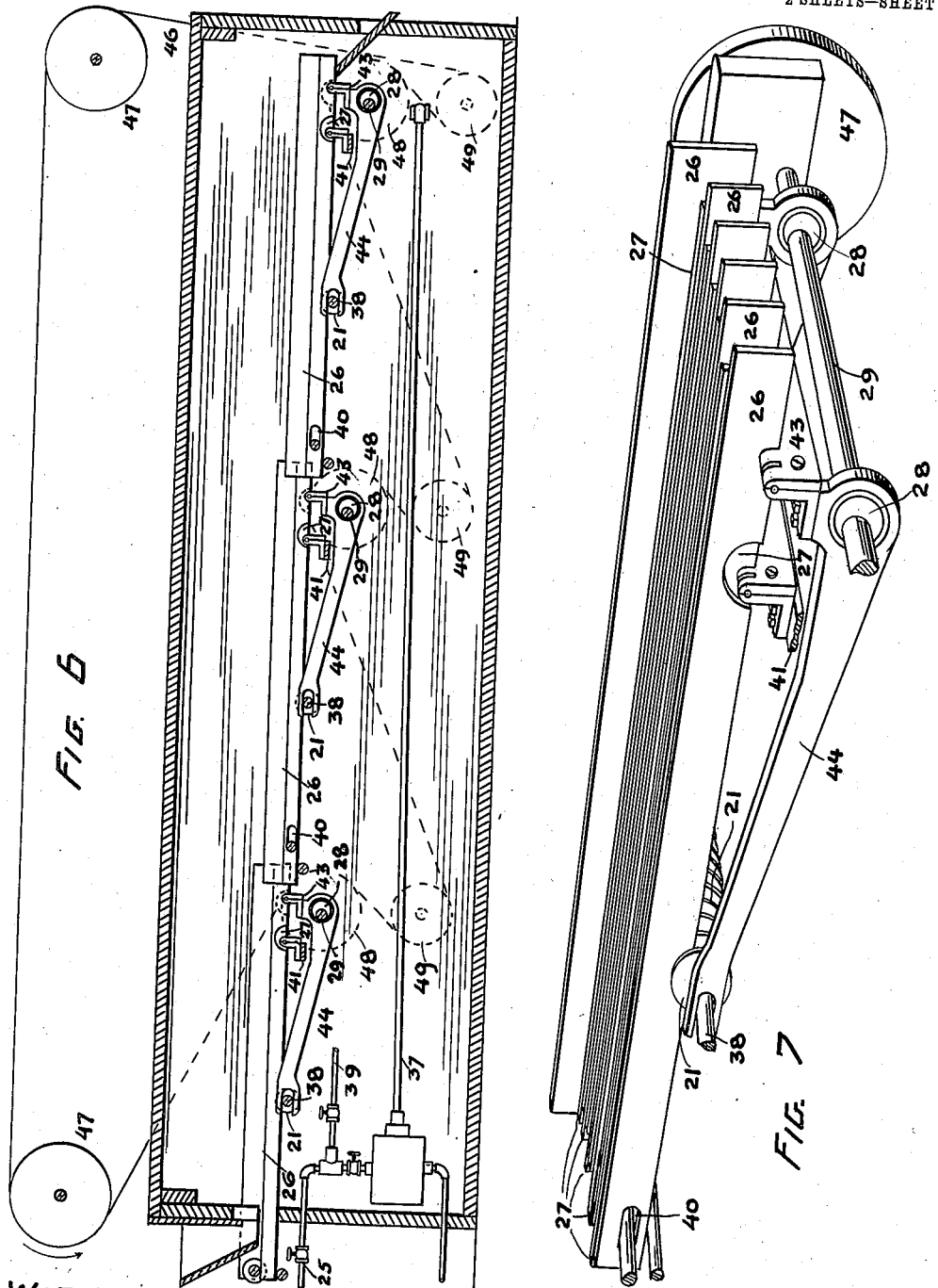

NEWTON BOOTH CONVERSE, OF FRESNO, CALIFORNIA, ASSIGNOR, BY DIRECT AND MESNE ASSIGNMENTS, TO HIMSELF AND J. E. DICKINSON, TRUSTEES, OF FRESNO, CALIFORNIA.

FEEDER OR CONVEYER MECHANISM.

No. 894,424.  Specification of Letters Patent.  Patented July 28, 1908.

Application filed November 10, 1904. Serial No. 232,090.

*To all whom it may concern:*

Be it known that I, NEWTON BOOTH CONVERSE, a citizen of the United States, residing at Fresno, in the county of Fresno and State of California, have invented certain new and useful Improvements in Feeder or Conveyer Mechanism, of which the following is a specification.

My invention relates to an improved conveying apparatus for conveying material in any solid form except in that of the finest powder.

It is useful for conveying coal and at the same time screening the same from dust, also for conveying packages, boxes, cans, or the like.

In the present instance I have shown an apparatus, such as may be used for conveying raisins in the process of treating the same preparatory to seeding them, but it is to be understood that the invention is not restricted to these uses, but may be used for many other purposes.

In the accompanying drawing, Figure 1 is a longitudinal section of the apparatus; Fig. 2 is an end view thereof; Fig. 3 is a broken vertical cross section through the rod supporting the washers; Fig. 4 is a broken perspective view of one of the supports for the conveyer blades; Fig. 5 is a longitudinal section of a modified form of the device; Fig. 6 is a similar view of a further modification; and Fig. 7 is a perspective view of one set of the blades detached.

Referring to the drawing, 1 represents a frame, transversely of which are mounted pairs of revolving shafts 2, 3, the ends of which extend through the side walls of the frame and carry thereon miter gears 4, 5, which are operated by miter gears 6, on a longitudinal shaft 7 extending along the side wall of the frame, so that all of said shafts revolve in unison. Said shafts carry thereon eccentrics 8, 9, which revolve in eccentric rings 10, 11, in supports 12, 13, for two sets of conveyer blades 14, 15. Said supports are notched or slit on their upper edges, as shown at 16, and the conveyer blades rest in said slits, and in addition there are transverse bars 17 which pass through apertures in the upper ends of the conveyer supports and also through apertures in the blades and compel the blades to move with the supports. Each conveyer blade is cut or recessed, as shown at 18, on its lower edge to form a clearance for the movement of the upper portion of the blade support of the other set.

By reason of the eccentric movement imparted to the conveyer supports by the transverse shafts, said conveyer supports are given a small circular movement depending upon the magnitude of eccentricity of the eccentric. The supports for one set of blades at one end thereof are connected with the supports of the same set at the other end by means of bars 19 screwed to the lower surfaces of bosses 20 depending from the supports at one of their ends, that is to say, at one side of the machine, the bars for the supports of the other set of conveyer blades being at the opposite end, or at the other side of the machine. These bars prevent the supports from turning and compel them to extend in an upright position from the eccentric rings.

The material will temporarily rest upon that set of conveyer blades which is uppermost and will move forward therewith until said set passes down and the other set of conveyer blades passes up between them, thereby raising the material from the first set and again giving it a forward motion. These conveyer blades are spaced from each other by washers 21 on a rod 38, also by the positions of the slots formed in their supports, the distance being such that the raisins cannot drop between the blades. At the same time any nails, cap stems, or other refuse will drop between the conveyer blades, so that this apparatus has an additional value in assisting in cleaning the raisins or other fruit. There is provided a hopper 22 at the rear end of the feeder into which the raisins are discharged, said hopper having a gate 23 regulating the rapidity of passage of the raisins down the hopper.

In the modification shown in Fig. 5, 24 represents a chamber for sweating or processing raisins or other fruit. Steam is supplied to said chamber by a pipe 25, and the chamber is heated by means of closed pipes 37 and steam is allowed to enter the chamber through an open pipe 39. I provide means for conveying the raisins through the chamber while undergoing such operation. These means comprise a series of sets of conveying blades 26 alternating with stationary blades 27. The conveying blades have the same circular movement given thereto as described in the first modification, and this is imparted by eccentrics 28 on shafts 29 rotated as before by miter gears 30 from a longitudinal shaft 31.

In the modification shown in Figs. 6 and 7, the conveying blades have movement transmitted to them at one end only, the other ends being slotted as shown at 40, and supported by a rod passing through said slots. The alternating supporting blades 27 are supported by a plate 41. The supports 43 for the conveyer blades are prevented turning by rearward extensions 44 forked at their ends and passing over the rods 38 which support the washers 21 as before. The blades of one set intermesh with those of the other. The eccentric shafts for the several sets are driven by means of a band 46 passing around driving pulleys 47, driven pulleys 48 on the shafts and guide pulleys 49.

In the present instance only one set of blades is movable, the object being to give a slow motion to the raisins or other material, in order to obtain the proper processing effect upon the raisins within an apparatus of comparatively small dimensions. By this construction the raisins are allowed to remain within the closed chamber subjected to the sweating process for a considerable length of time and during the whole time they are constantly in motion. The constant movement turns them over so as to thoroughly expose them to the action of moisture or other influences. They are passed from one set of conveyer blades to the next set of the series by being transferred over the gaps 34 between the ends of the blades, which are sufficiently small to prevent the raisins dropping therebetween. The raisins are fed at one end underneath a gate 35, and out underneath a gate 36 at the other end of the chamber.

I have herein illustrated two forms of apparatus to which my invention may be applied, but other forms will suggest themselves and will be within the scope of my invention. Thus by giving a proper length to the chamber and by applying dry heat instead of moist heat and a blower to circulate the air the apparatus may be used as a drier for the raisins.

I claim:—

1. In an apparatus for conveying small bodies, such as raisins or the like, two sets of alternating conveyer blades, spacing washers interposed between said blades intermediately of the ends thereof, and means operating at both ends of the blades, for alternately moving the two sets forwards, each set when so moving forwards being elevated above the other set, and walls between which the conveyer blades move, said walls extending above the surfaces of said blades to confine the body so conveyed, substantially as described.

2. In an apparatus for conveying small bodies, such as raisins or the like, the combination of two sets of alternating conveyer blades, spacing washers interposed between said blades intermediately of the ends thereof, and means for giving a circular motion to the blades of one set while maintaining said blades parallel, thereby alternately moving them above and below the blades of the other set, and walls between which the conveyer blades move, said walls extending above the surfaces of said blades to confine the body so conveyed, substantially as described.

3. In an apparatus for conveying small bodies, such as raisins or the like, the combination of two sets of alternating conveyer blades, spacing washers interposed between said blades intermediately of the ends thereof, and means for giving to each set alternately a circular motion, while maintaining the blades parallel in all positions, and walls between which the conveyer blades move, said walls extending above the surfaces of said blades to confine the body so conveyed, substantially as described.

4. In an apparatus for conveying small bodies, such as raisins or the like, the combination of two sets of alternating conveyer blades, spacing washers interposed between said blades intermediately of the ends thereof, revolving shafts at the front and at the rear end of each set, eccentrics on said shafts respectively connected to the blades of the two sets and extending from their shafts in diametrically opposite directions, means for revolving said shafts in unison, and walls between which the conveyer blades move, said walls extending above the surfaces of said blades to confine the body so conveyed, substantially as described.

5. In an apparatus for conveying small bodies, such as raisins or the like, the combination of alternating conveyer blades, spacing washers interposed between said blades intermediately of the ends thereof, shafts at the front and rear ends of one of said sets, eccentrics mounted thereon connected to the blades of said set, means for revolving said shafts in unison, and walls between which the conveyer blades move, said walls extending above the surfaces of said blades to confine the body so conveyed, substantially as described.

6. In an apparatus for conveying small bodies, such as raisins or the like, the combination of two sets of alternating blades, spacing washers interposed between said blades intermediately of the ends thereof, a shaft at the front ends of the blades of one set, an eccentric mounted thereon connected to the blades of said set, means for revolving said shaft, and walls between which the conveyer blades move, said walls extending above the surfaces of said blades to confine the body so conveyed, substantially as described.

7. In an apparatus for conveying small bodies, such as raisins or the like, two sets of alternating conveyer blades, spacing washers interposed between said blades intermediately of the ends thereof, and means operating at both ends of the blades, for alternately moving the two sets forwards, each set when so moving forwards being elevated above the other set, the outermost blades being extended above the other blades to form walls to confine the bodies so conveyed, substantially as described.

8. In an apparatus for conveying small bodies, such as raisins or the like, the combination of two sets of alternating conveyer blades, spacing washers interposed between said blades intermediately of the ends thereof, and means for giving a circular motion to the blades of one set while maintaining said blades parallel, thereby alternately moving them above and below the blades of the other set, the outermost blades being extended above the other blades to form walls to confine the bodies so conveyed, substantially as described.

9. In an apparatus for conveying small bodies, such as raisins or the like, the combination of two sets of alternating conveyer blades, spacing washers interposed between said blades intermediately of the ends thereof, and means for giving to each set alternately a circular motion, while maintaining the blades parallel in all positions, the outermost blades being extended above the other blades to form walls to confine the bodies so conveyed, substantially as described.

10. In an apparatus for conveying small bodies, such as raisins or the like, the combination of two sets of alternating conveyer blades, spacing washers interposed between said blades intermediately of the ends thereof, revolving shafts at the front and at the rear end of each set, eccentrics on said shafts respectively connected to the blades of the two sets and extending from their shafts in diametrically opposite directions, and means for revolving said shafts in unison, the outermost blades being extended above the other blades to form walls to confine the bodies so conveyed, substantially as described.

11. In an apparatus for conveying small bodies, such as raisins or the like, the combination of alternating conveyer blades, spacing washers interposed between said blades intermediately of the ends thereof, shafts at the front and rear ends of one of said sets, eccentrics mounted thereon connected to the blades of said set, and means for revolving said shafts in unison, the outermost blades being extended above the other blades to form walls to confine the bodies so conveyed, substantially as described.

12. In an apparatus for conveying small bodies, such as raisins or the like, the combination of two sets of alternating blades, spacing washers interposed between said blades intermediately of the ends thereof, a shaft at the front ends of the blades of one set, an eccentric mounted thereon connected to the blades of said set, and means for revolving said shaft, the outermost blades being extended above the other blades to form walls to confine the bodies so conveyed, substantially as described.

13. In an apparatus of the character described, two sets of alternating conveyer blades, spacing means interposed between said blades intermediately of the ends thereof, and means for alternately moving the two sets forwards, each set when so moving forward being elevated above the other set, the outermost blades extending higher than the remaining blades to form confining walls for the material so conveyed, substantially as described.

14. In an apparatus of the character described, the combination of a plurality of sets of conveyer blades, spacing means interposed between said blades intermediately of the ends thereof, and means for moving forwards each set in succession, said set when so moving forwards being elevated above the other blades, the outermost blades extending higher than the remaining blades to form confining walls for the material so conveyed, substantially as described.

15. In an apparatus of the character described, the combination of a plurality of sets of conveyer blades, spacing means interposed between said blades intermediately of the ends thereof means for moving forwards each set in succession, each said set when so moving forwards being elevated above the other blades, and side walls for confining the material so conveyed upon the blades substantially as described.

16. In an apparatus of the character described, the combination of two sets of alternating conveyer blades, independent supports one for each set, two shafts, one for each support and upon which said support is eccentrically mounted, and means for revolving said shafts in unison whereby the blades of the two sets are raised alternately, substantially as described.

17. In an apparatus of the character described, the combination of two sets of alternating conveyer blades, independent supports, one for all the blades of each set, two pairs of eccentrics, one pair for each support, two shafts, one for each pair of eccentrics, and means for revolving said shafts in unison, whereby the blades of the two sets are alternately raised, substantially as described.

18. In an apparatus of the character described, the combination of two sets of conveyer blades, slotted supports for engaging the blades of the respective sets, and means for imparting to said supports alternating circular movements, substantialy as described.

19. In an apparatus of the character described, the combination of two sets of alternating blades, cross pieces having slots in which one end of the blades of the sets are respectively supported, an eccentric operatively connected to one of said pieces, a shaft for operating said eccentric to impart circular motion to one end of one set of blades, a support for the other ends of said blades, and means for confining said ends of one set to orbits of reciprocation, substantially as described.

In witness whereof I have hereunto set my hand in the presence of two subscribing witnesses.

NEWTON BOOTH CONVERSE.

Witnesses:
L. B. HAYHURST,
MILES WALLACE.